United States Patent
Zhang et al.

(10) Patent No.: US 12,160,356 B2
(45) Date of Patent: Dec. 3, 2024

(54) FLOW TABLE SENDING METHOD AND RELATED APPARATUS

(71) Applicant: Huawei Technologies Co., Ltd., Shenzhen (CN)

(72) Inventors: Zhonggang Zhang, Beijing (CN); Xuefeng Wu, Beijing (CN); Yanxiang Hou, Beijing (CN); Xiaoke Zhao, Nanjing (CN); Wei Zhang, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 18/331,664

(22) Filed: Jun. 8, 2023

(65) Prior Publication Data

US 2023/0327968 A1      Oct. 12, 2023

Related U.S. Application Data

(63) Continuation of application No. PCT/CN2021/120728, filed on Sep. 26, 2021.

(30) Foreign Application Priority Data

Dec. 9, 2020   (CN) .......................... 202011449007.3

(51) Int. Cl.
    *H04L 43/067*   (2022.01)
    *H04L 43/022*   (2022.01)
    *H04L 43/062*   (2022.01)
    *H04L 43/0817*  (2022.01)
    *H04L 43/0823*  (2022.01)

(52) U.S. Cl.
    CPC .......... *H04L 43/067* (2013.01); *H04L 43/022* (2013.01); *H04L 43/062* (2013.01); *H04L 43/0817* (2013.01); *H04L 43/0823* (2013.01)

(58) Field of Classification Search
    CPC .......................... H04L 43/022; H04L 43/0823
    See application file for complete search history.

(56) References Cited

U.S. PATENT DOCUMENTS

| | | | |
|---|---|---|---|
| 7,729,271 B2 * | 6/2010 | Tsuchiya | H04L 43/022 370/252 |
| 2017/0111813 A1 | 4/2017 | Townend et al. | |
| 2018/0270132 A1 * | 9/2018 | Hashimoto | H04L 43/0823 |

FOREIGN PATENT DOCUMENTS

| | | |
|---|---|---|
| CN | 103929334 A | 7/2014 |
| CN | 106453355 A | 2/2017 |
| CN | 107196816 A | 9/2017 |
| KR | 20110075298 A | 7/2011 |

* cited by examiner

*Primary Examiner* — Barbara B Anyan
(74) *Attorney, Agent, or Firm* — Slater Matsil, LLP

(57) ABSTRACT

In accordance with an embodiment, a method includes generating, by a network device, a flow table comprising a plurality of flow records; determining, by the network device, whether a data flow corresponding to the plurality of flow records is an abnormal flow; and sending, by the network device, a flow record of the abnormal flow to an analyzer in response to a determination that the data flow is the abnormal flow, so that the analyzer analyzes the abnormal flow.

20 Claims, 10 Drawing Sheets

|  | Source address | Destination address | Protocol type | Source port number | Destination port number | Quantity of packets | Other information |
|---|---|---|---|---|---|---|---|
| Flow record 1 | IP 1 | IP 2 | TCP | 32768 | 80 | 1000 | ... |
| Flow record 2 | IP 2 | IP 1 | TCP | 80 | 32768 | 800 | ... |
| Flow record 3 | IP 1 | IP 2 | TCP | 48541 | 80 | 2000 | ... |
| Flow record 4 | IP 2 | IP 1 | TCP | 80 | 48541 | 300 | ... |

FIG. 7

|  | Client address | Server address | Protocol type | Server port number | Session statistics | Quantity of packets | Other information |
|---|---|---|---|---|---|---|---|
| Flow record 5 | IP 1 | IP 2 | TCP | 80 | 2/0/0 | 3000 | ... |
| Flow record 6 | IP 1 | IP 2 | TCP | 80 | 2/0/0 | 1100 | ... |

FIG. 9

| | Source address | Destination address | Protocol type | Session statistics | Quantity of packets | Other information |
|---|---|---|---|---|---|---|
| Flow record 7 | IP 1 | IP 2 | TCP | 2/0/0 | 3000 | ... |
| Flow record 8 | IP 2 | IP 1 | TCP | 2/0/0 | 1100 | ... |

FIG. 11

FLOW TABLE SENDING METHOD AND RELATED APPARATUS

CROSS-REFERENCE TO RELATED APPLICATIONS

This application is a continuation of International Application No. PCT/CN2021/120728, filed on Sep. 26, 2021, which claims priority to Chinese Application No. 202011449007.3, filed on Dec. 9, 2020. The disclosures of the aforementioned applications are hereby incorporated by reference in their entireties.

TECHNICAL FIELD

This application relates to the field of communication technologies, and in particular, to a flow table sending method and a related apparatus.

BACKGROUND

In network communication, a network device (a switch, a router, a virtual network device, or the like) is used to implement packet transmission between two devices. For example, a first device transmits a packet to the switch, and then the switch transmits the packet to a second device, to complete data exchange between the first device and the second device. It can be learned that packet forwarding quality of the network device directly affects data transmission quality between target devices. Therefore, the packet forwarding quality of the network device needs to be managed and controlled.

When forwarding the packet, the network device may extract packet information to generate a corresponding traffic statistics table (also referred to as a flow table). The traffic statistics table includes statistical information (referred to as a flow record) of a plurality of data flows. The network device sends the generated flow table to an analyzer, so that the analyzer analyzes a flow record in the flow table to monitor a packet forwarding capability of the network device. For example, based on the flow table, statistical information of forwarding traffic of the network device may be visualized, and an abnormality occurring when the network device forwards the packet may be found. Usually, one network device may generate dozens of thousands to more than a hundred of thousands of flow records per second. Limited by hardware performance, a flow record analysis speed of the analyzer can be approximately only ten thousands of flow records per second (an analyzer cluster including three physical servers is used as an example). It can be learned that, if the flow table generated by the network device is directly sent to the analyzer, the analysis speed of the analyzer cannot match a quantity of flow records that need to be analyzed.

To resolve the foregoing problem, an access control list (ACL) is configured on the network device to obtain, through filtering, a packet that needs to be analyzed, and the network device creates a flow table only for a packet obtained through matching by using the ACL, to reduce a quantity of flow records in the flow table. In other words, a quantity of flow records to be analyzed by the analyzer can be reduced. However, a quantity of flow records generated in the foregoing manner still cannot match the analysis speed of the analyzer. In addition, the packet obtained through matching by using the ACL cannot represent all packets well, and an abnormal packet is especially easily missed. Consequently, strength of monitoring the packet forwarding capability of the network device by the analyzer is reduced.

SUMMARY

This application provides a flow table sending method and a related apparatus, so that only a flow record of an abnormal flow in a flow table and/or an aggregation flow table are/is sent, to reduce a quantity of flow records to be analyzed by an analyzer. In addition, it can be ensured that the analyzer analyzes each abnormal data flow, to ensure management and control of a network device.

According to a first aspect, this application provides a flow table sending method. The method includes: A network device generates a flow table. The flow table includes a plurality of flow records. The network device determines whether a data flow corresponding to the plurality of flow records is an abnormal flow. The network device sends a flow record of an abnormal flow to an analyzer when determining the abnormal flow, so that the analyzer analyzes the abnormal flow.

In the method, after the network device generates the flow table, to ensure that the analyzer can analyze each abnormal data flow to ensure management and control of the network device, the network device determines each flow record in the flow table, to determine the abnormal flow, and sends the flow record of the abnormal flow to the analyzer. In this way, the analyzer can analyze each abnormal data flow. In addition, because the network device sends only the flow record of the abnormal flow, a quantity of sent flow records can be greatly reduced, so that a quantity of flow records that need to be analyzed better matches a flow record analysis speed of the analyzer, thereby fundamentally resolving a problem that a quantity of flow records sent by the network device does not match an analysis capability of the analyzer.

In an implementation, the method further includes: The network device processes the plurality of flow records based on an aggregation rule, to obtain a processed flow record. A quantity of processed flow records is less than a quantity of the plurality of flow records. The network device sends the processed flow record to the analyzer.

The plurality of flow records may include both the flow record of the abnormal flow and a flow record of a normal flow, to analyze overall performance of the data flow that corresponds to the plurality of flow records and that is forwarded by the network device. After processing, the plurality of flow records may be aggregated into a smaller quantity of flow records, to reduce the quantity of flow records that need to be analyzed by the analyzer. In addition, based on a specific flow record of the abnormal flow sent in the foregoing process, not only the abnormal flow can be specifically analyzed, but also all data flows forwarded by the network device can be analyzed.

In an implementation, the network device sends the flow record of the abnormal flow based on a first period, and sends the processed flow record based on a second period, and the first period is less than or equal to the second period.

Therefore, the network device may asynchronously send, based on different periods, the flow record of the abnormal flow and flow records of all flows including the abnormal flow, and in particular, may send the flow record of the abnormal flow based on a shorter period, to improve timeliness of analyzing the abnormal flow by the analyzer.

In an implementation, that the network device processes the plurality of flow records based on an aggregation rule, to obtain a processed flow record includes: The network device performs, based on the aggregation rule, aggregation processing on flow records that include a same identifier, to obtain a processed flow record.

Therefore, after processing, the plurality of flow records can be aggregated into a smaller quantity of flow records, to reduce the quantity of flow records that need to be analyzed by the analyzer. In addition, flow records of a same type (having a same identifier) are aggregated in advance, so that the analyzer can directly perform an overall analysis on different types of flow records, to improve an overall effect of the analysis.

In an implementation, each flow record includes an identifier identifying a data flow and statistical information of the data flow, and the performing aggregation processing on flow records that include a same identifier includes: identifying target flow records that include a same identifier in the plurality of flow records, where the same identifier is a first identifier; and determining a second identifier based on the aggregation rule and the first identifier; aggregating statistical information in the target flow records, to obtain aggregated statistical information; and obtaining the processed flow record based on the second identifier and the aggregated statistical information.

Therefore, the network device may aggregate the flow records in the flow table based on a same identifier, to reduce a quantity of processed flow records.

In an implementation, the flow record of the abnormal flow carries an abnormality type mark.

Therefore, an abnormality type of the abnormal flow may be recorded in the flow record that is of the abnormal flow and that is sent by the network device, to provide an analysis direction for the analyzer.

In an implementation, the network device stores the flow record of the abnormal flow in an abnormal flow table, and stores the processed flow record in a statistical flow table.

Therefore, the flow record of the abnormal flow and the processed flow record may be stored separately, so that the network device extracts, for sending, a flow record from a corresponding storage medium based on a requirement, to improve flow record management effectiveness.

In an implementation, the network device determines, at a preset time point, whether a flow record of an abnormal flow exists. The preset time point is a time point at which the flow record ages, a time point at which data flow transmission ends, or a time point at which a preset time period ends.

Therefore, the flow record of the abnormal flow may be sent in time when the flow table ages or when data flow transmission ends. In addition, when the data flow is too long, determining whether the data flow is an abnormal flow and sending may be performed for a plurality of times, to improve timeliness of analyzing the data flow.

In an implementation, that a network device generates a flow table includes: The network device generates the flow table based on a filtered packet.

Therefore, a packet matching rule such as an ACL may also be set on the network device, so that the network device first selects a packet that need to be analyzed, to reduce, to some extent, flow records that need to be analyzed.

According to a second aspect, this application further provides a flow table sending apparatus. The flow table sending apparatus has a function of implementing a behavior of the foregoing network device. The function may be implemented by hardware, or may be implemented by hardware executing corresponding software. The hardware or software includes one or more unit or modules corresponding to the foregoing function. In a possible design, the flow table sending apparatus includes a processing unit. The processing unit is configured to generate a flow table. The flow table includes a plurality of flow records. The processing unit is further configured to determine whether a data flow corresponding to the plurality of flow records is an abnormal flow. A sending unit is configured to send a flow record of an abnormal flow to an analyzer when the processing unit determines the abnormal flow, so that the analyzer analyzes the abnormal flow.

According to the apparatus, after the network device generates the flow table, to ensure that the analyzer can analyze each abnormal data flow to ensure management and control of the network device, the network device determines each flow record in the flow table, to determine the abnormal flow, and sends the flow record of the abnormal flow to the analyzer. In this way, the analyzer can analyze each abnormal data flow. In addition, because the network device sends only the flow record of the abnormal flow, a quantity of sent flow records can be greatly reduced, so that a quantity of flow records that need to be analyzed better matches a flow record analysis speed of the analyzer, thereby fundamentally resolving a problem that a quantity of flow records sent by the network device does not match an analysis capability of the analyzer.

According to a third aspect, this application further provides a network device. The network device includes a memory and a processor. The memory and the processor are coupled, the memory is configured to store computer program code/instructions, and when the processor executes the computer program code/instructions, the network device is enabled to perform the method according to the first aspect and the implementations of the first aspect.

According to a fourth aspect, this application further provides a computer storage medium. The computer storage medium stores computer program code/instructions. When the computer program code/instructions runs/run on a computer device, the computer device is enabled to perform the method according to the first aspect and the implementations of the first aspect.

According to a fifth aspect, this application further provides a computer program product including instructions. When the computer program product runs on a computer, the computer is enabled to perform the method according to the first aspect and the implementations of the first aspect.

According to a sixth aspect, this application further provides a chip system. The chip system includes a processor, configured to support the foregoing apparatus or device to implement a function in the first aspect and the implementations of the first aspect.

For beneficial effects of the second to the sixth aspects of this application, refer to the first aspect.

BRIEF DESCRIPTION OF THE DRAWINGS

To describe the technical solutions in this application more clearly, the following briefly describes the accompanying drawings required for describing the embodiments. Apparently, a person of ordinary skill in the art may derive other drawings from these accompanying drawings without creative efforts.

FIG. 7 is a schematic diagram of a structure of a flow table according to an embodiment of this application;

FIG. 9 is a schematic diagram of processed flow records according to an embodiment of this application;

FIG. 11 is another schematic flowchart of aggregating flow records according to an embodiment of this application;

DETAILED DESCRIPTION OF ILLUSTRATIVE EMBODIMENTS

The following clearly and completely describes the technical solutions in embodiments of the present invention with reference to the accompanying drawings in embodiments of the present invention. Apparently, the described embodiments are merely some rather than all embodiments of the present invention. All other embodiments obtained by persons of ordinary skill in the art based on embodiment of the present invention without creative efforts shall fall within the protection scope of the present invention.

Figure 1:
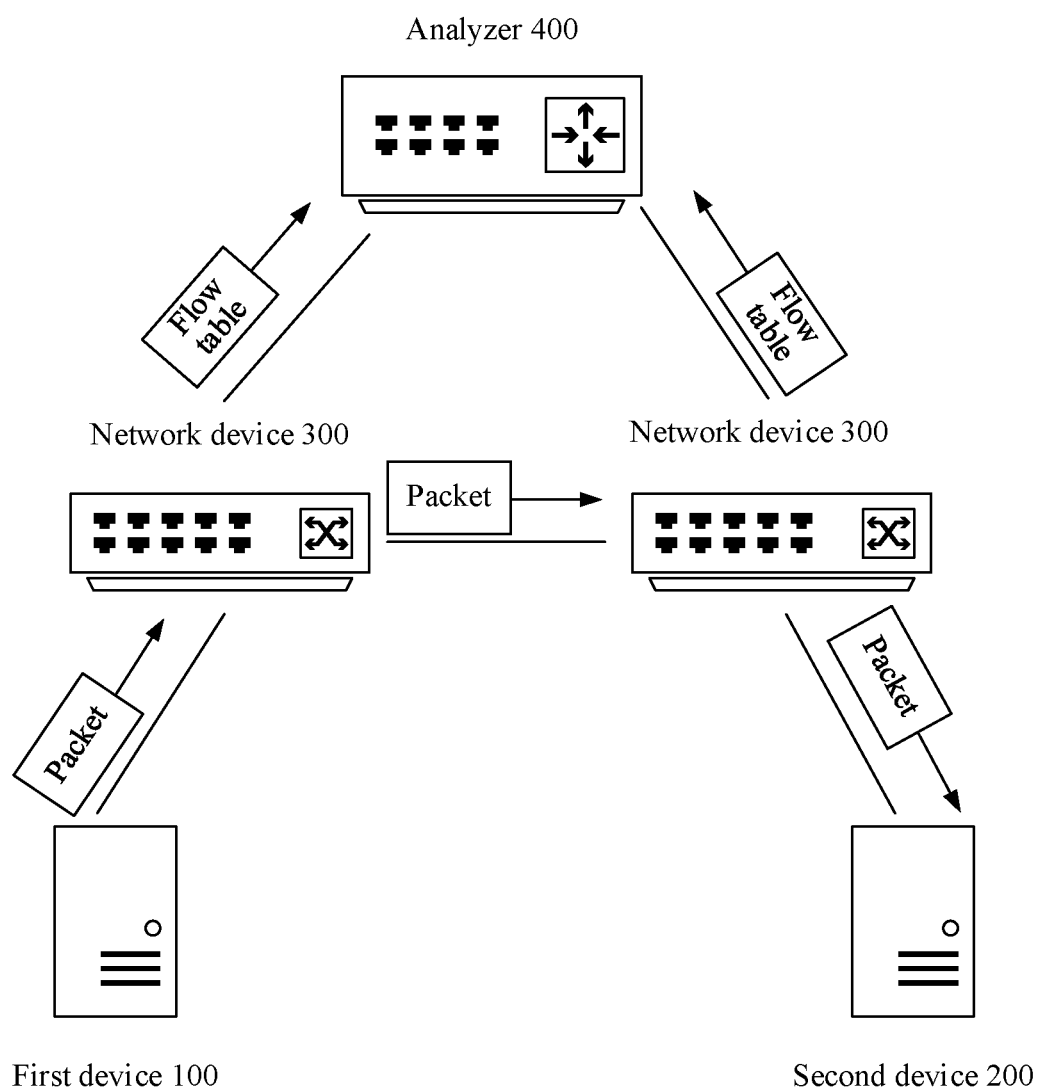
FIG. 1 is a schematic diagram of a packet transmission scenario according to an embodiment of this application.

FIG. 1 is a schematic diagram of a packet transmission scenario according to an embodiment of this application. As shown in FIG. 1, when a first device (a transmit end device) 100 in a network sends a packet to a second device (a receive end device) 200, the packet needs to pass through a plurality of network devices 300 on a forwarding path between the first device 100 and the second device 200. Each network device 300 is configured to: receive a packet from an upstream network device on the forwarding path, and forward the packet to a downstream node on the forwarding path. Whether the forwarding path between the first device 100 and the second device 200 needs to be switched may be determined by monitoring packet forwarding quality of each network device 300, to improve data transmission quality between the first device 100 and the second device 200. The network device 300 has a packet traffic analysis function. To be specific, the network device 300 may extract corresponding data flow information based on a received packet, to generate a traffic statistics table (a flow table). The flow table is used to record a flow record of each data flow, and each flow record includes an identifier and statistical information of a data flow, for example, an IP address, a protocol type, a port number, a quantity of packets, a quantity of bytes, a delay, or packet loss information. The flow record may be used to analyze forwarding quality of the data flow, to monitor the packet forwarding quality of the network device 300. After receiving a packet, each network device 300 may generate a flow table corresponding to the packet, and send the flow table to an analyzer 400, so that the analyzer 400 analyzes a flow record in the flow table.

Figure 2:
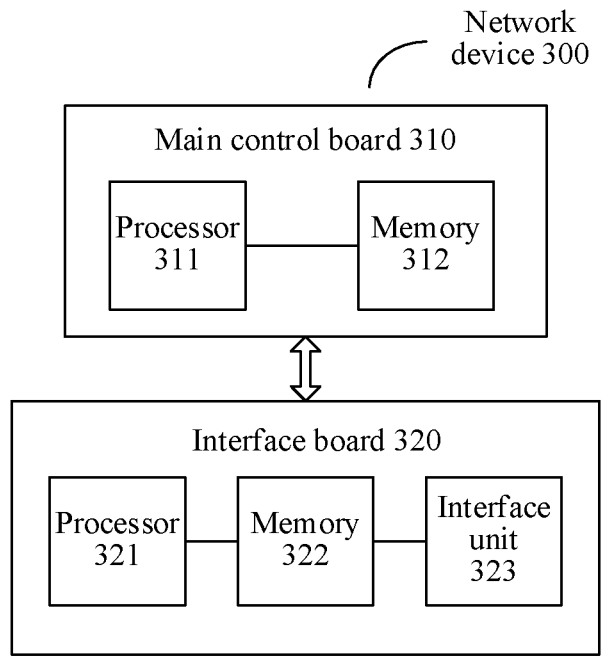
FIG. 2 is a schematic diagram of a structure of a network device in FIG. 1 according to an embodiment of this application.

FIG. 2 is a schematic diagram of a structure of a network device in FIG. 1 according to an embodiment of this application. A network device 300 may be specifically a router, a switch, a network host, a server, or the like, and may serve as a forwarding device and forward a packet between a first device 100 and a second device 200. The network device 300 may include at least one processor, at least one memory, and at least one interface unit. For example, as shown in FIG. 2, the network device 300 may specifically include a main control board 310 and an interface board 320. The main control board 310 includes a processor 311 and a memory 312. The processor 311 and the memory 312 are coupled and connected. The memory 312 stores program instructions. The processor 311 may invoke the program instructions in the memory 312, so that the network device 300 performs a related method, for example, generates a flow table and determines an abnormal flow. The interface board 320 may include a processor 321, a memory 322, and an interface unit 323. The processor 321, the memory 322, and the interface unit 323 are coupled and connected. The memory 322 stores program instructions. The processor 321 may invoke the program instructions in the memory 322, so that the network device 300 performs a related method, for example, receives and forwards a packet through the interface unit 323. In this embodiment of this application, the interface unit 323 is configured to establish a communication link with another network device, to implement packet receiving and sending. The interface unit 323 may include one or more fiber link interfaces, an Ethernet interface, a microwave link interface, a copper wire interface, or the like. The main control board 310 and the interface board 320 may establish a connection through a bus, to implement data exchange.

Figure 3:
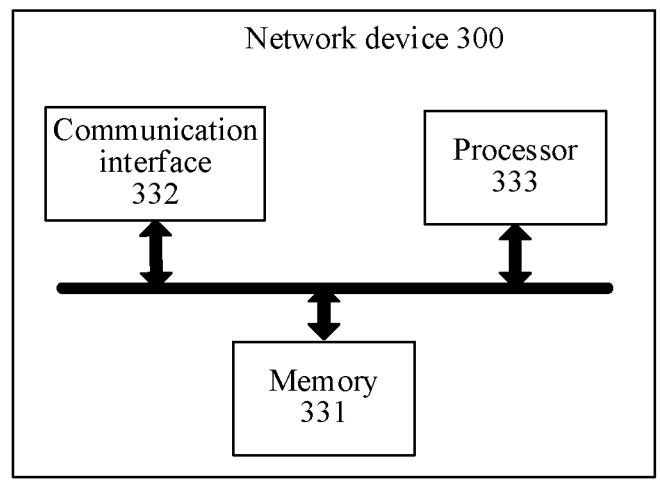
FIG. 3 is a schematic diagram of another structure of a network device in FIG. 1 according to an embodiment of this application.

FIG. 3 is a schematic diagram of another structure of a network device in FIG. 1 according to an embodiment of this application. A network device 300 may be specifically a router, a switch, a network host, a server, or the like, and may serve as a forwarding device and forward a packet between a first device 100 and a second device 200. As shown in FIG. 3, the network device 300 may include a memory 331, a communication interface 332, and a processor 333. The memory 331, the communication interface 332, and the processor 333 are coupled and connected. The memory 331 stores program instructions. The processor 333 may invoke the program instructions in the memory 331, so that the network device 300 performs a related method, for example, receives a packet, generates a flow table, and receives and forwards a packet through the communication interface 332.

In this embodiment of this application, a processor of the network device 300, for example, the processor 311 and the processor 321 shown in FIG. 2, or the processor 333 shown in FIG. 3, each may include one or more processing units such as a system on a chip (SoC), a central processing unit (CPU), a microcontroller (MCU), or a storage controller. Different processing units may be independent components, or may be integrated into one or more processors.

In this embodiment of this application, a memory of the network device 300, for example, the memory 312 and the memory 322 shown in FIG. 2, or the memory 331 shown in FIG. 3, each may include one or more storage units, for example, may include a volatile memory, for example, a dynamic random access memory (DRAM) or a static random access memory (SRAM); and may further include a nonvolatile memory (NVM), for example, a read-only memory (ROM) or a flash memory. Different storage units may be independent components, or may be integrated or encapsulated in one or more processors or communication interfaces, and become a part of the processor or communication interface.

In this embodiment of this application, the communication interface 332 of the network device 300 may include a network adapter, a network interface card, a local area network adapter (LAN adapter), a network interface controller (NIC), a modem, and the like. The communication interface may be an independent component, or may be partially or completely integrated or encapsulated in the processor, and become a part of the processor.

It may be understood that the structure shown in this embodiment of this application does not constitute a specific limitation on the network device. In some other embodiments of this application, the network device may include more or fewer components than those shown in the figure, some components may be combined, some components may be split, or different component arrangements may be used. The components shown in the figure may be implemented by hardware, software, or a combination of software and hardware.

Figure 4:
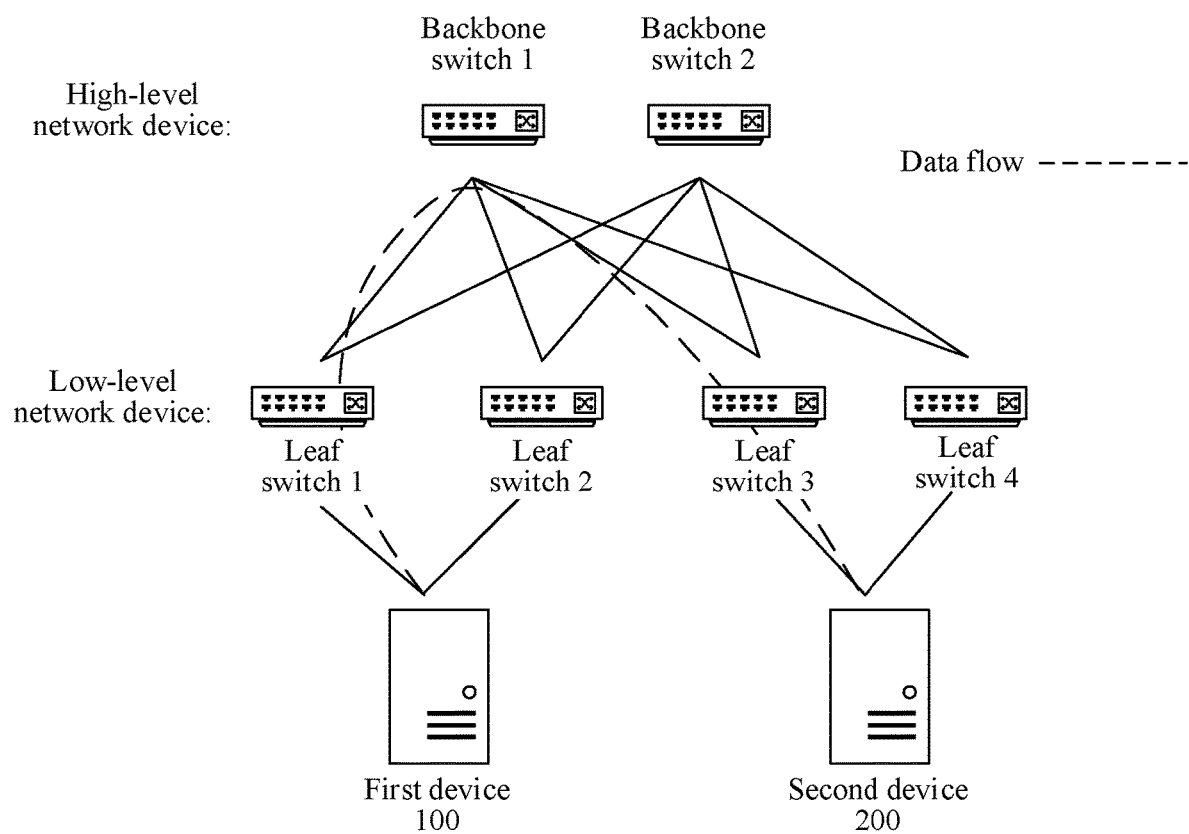
FIG. 4 is a schematic diagram of an architecture of a network system for forwarding a packet according to an embodiment of this application.

FIG. 4 is a schematic diagram of an architecture of a network system for forwarding a packet according to an embodiment of this application. For example, the network architecture may be applied to a data center (DC), to deploy a high performance computing (HPC) cluster, a distributed storage system (DSS), and a distributed machine learning system, and another distributed service system. As shown in FIG. 4, the network system has a two-level system architecture, and includes at least one high-level network device (for example, a backbone switch) and a plurality of low-level network devices (for example, leaf switches), and each low-level network device is separately connected to all high-level network devices. The low-level network device is configured to be connected to a server, a network host, or another network device. The high-level network device is a backbone device of the network system, and is configured to connect all low-level network devices.

In the structure shown in FIG. 4, any server, any network host, or another network device may send a packet to another server, another network host, or another network device by using a forwarding device. A first device 100 that sends a packet may be referred to as a source node or a transmit end device (sender). A second device 200 that receives a packet may be referred to as a destination node or a receive end device (receiver). One sender may simultaneously send a packet to a plurality of receivers, or a plurality of senders may send a packet to a same receiver. If the sender continuously sends a plurality of packets to the receiver, it may be considered that the sender sends a data flow (which may also be referred to as a service flow) to the receiver. FIG. 4 is used as an example. A data flow sent by the first device 100 to the second device 200 arrives at the second device 200 through a leaf switch 1, a backbone switch 1, and a leaf switch 3. The leaf switch 1, the backbone switch 1, and the leaf switch 3 each establish a corresponding flow record for the data flow.

Figure 5:
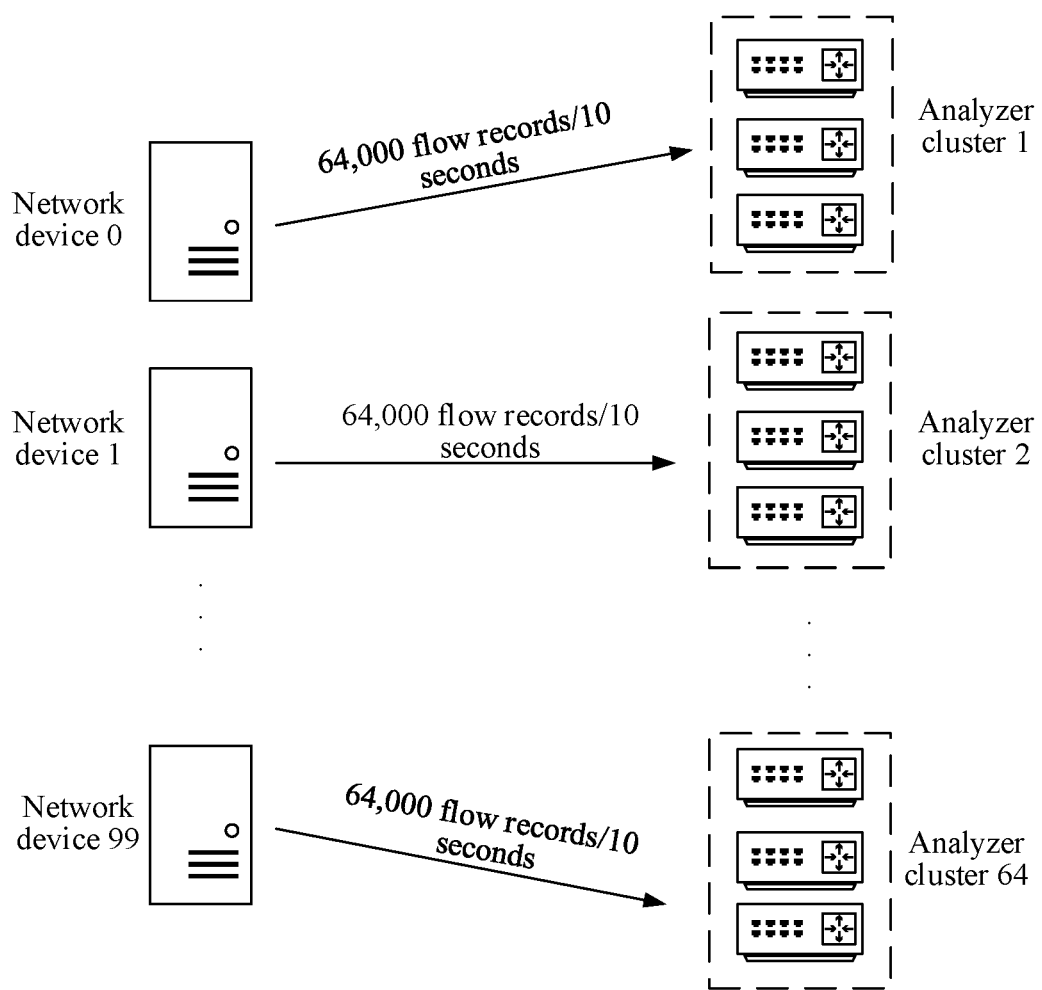
FIG. 5 is a schematic diagram of a process in which a network device sends a flow table to an analyzer according to an embodiment of this application.

FIG. 5 is a schematic diagram of a process in which a network device sends a flow table to an analyzer according to an embodiment of this application. As shown in FIG. 5, a network system includes 100 network devices (that is, a network device o to a network device 99) and a plurality of analyzer clusters. Each network device sends a flow table to an analyzer cluster. Each analyzer cluster includes three physical servers. For example, each network device generates 64,000 flow records, and sends the flow table once every 10 seconds. To ensure monitoring precision of the network device, all the 64,000 flow records generated by the network device are selected and sent. If an analysis speed of each analyzer cluster is 10,000 flow records per second, at least 64000×100:10: 10000=64 analyzer clusters are required. It can be learned that, although the foregoing process can ensure precision of analyzing forwarding quality of the network device by the analyzer, the analyzer cluster consumes too many resources, and analysis costs are too high.

Embodiments of this application provide a flow table sending method and a related apparatus, to resolve a technical problem in the foregoing technical solutions.

Embodiment 1

Embodiment 1 of this application provides a flow table sending method, applied to a network device. The network device may be any device that is configured to forward a packet in FIG. 1 to FIG. 5, for example, a switch, a server, a router, or a network host.

Figure 6:
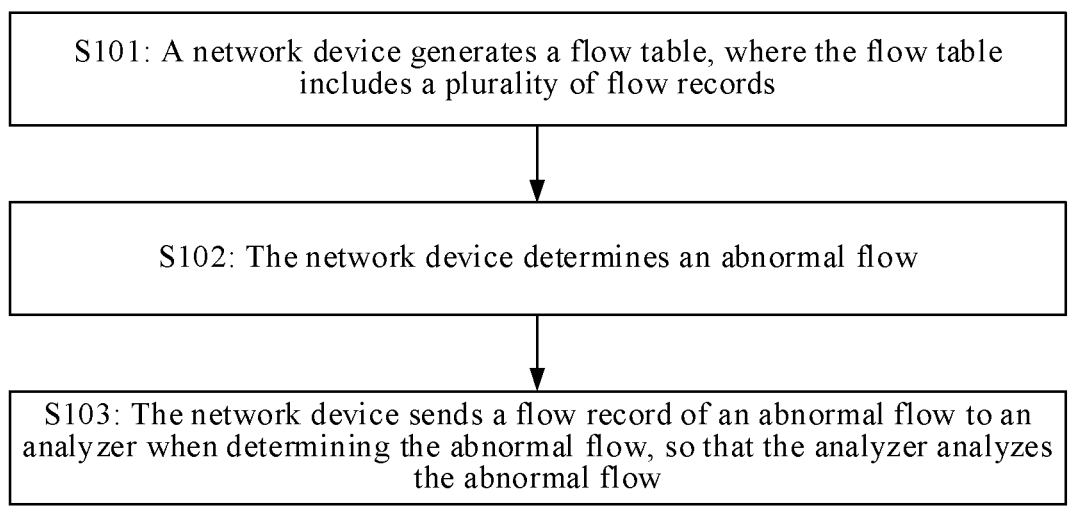
FIG. 6 is a schematic flowchart of a flow table sending method according to an embodiment of this application.

FIG. 6 is a schematic flowchart of a flow table sending method according to an embodiment of this application. As shown in FIG. 6, the method includes the following steps.

S101: A network device generates a flow table, where the flow table includes a plurality of flow records.

The network device may receive a packet sent by a first device 100 or a downstream network device located on a packet forwarding path. FIG. 4 is used as an example. A leaf switch 1 receives a packet sent by the first device 100, a backbone switch 1 receives a packet sent by the leaf switch 1 that is a downstream network device located on the packet forwarding path, and a leaf switch 3 receives a packet sent by the backbone switch 1 that is a downstream network device located on the packet forwarding path.

The network device may analyze a received packet by using a hardware chip, for example, a forwarding chip, for example, analyze information such as a packet header, for example, aggregate packets with same tuple information into a same data flow, and generate statistical information corresponding to the data flow. The tuple information and the statistical information corresponding to the data flow are used as a flow record, and flow records corresponding to a plurality of data flows are written into a same table, to obtain a traffic statistics table. FIG. 7 is a schematic diagram of a structure of a flow table according to an embodiment of this application. FIG. 7 shows a flow table generated based on 5-tuple information. To be specific, packets with same 5-tuple information are aggregated into one data flow, and a flow record of each data flow is correspondingly generated. Each flow record includes 5-tuple information (a source address, a destination address, a protocol type, a source port number, and a destination port number), and further includes a quantity of packets corresponding to a data flow and other information, for example, a flow start time point, a flow refresh time point, a transmission control protocol (TCP) flag, a time to live (TTL), an inbound interface, an outbound interface, a quantity of bytes, and a packet abnormality flag. For example, a flow record 1 in FIG. 7 indicates a flow record of a data flow whose source address is IP 1, destination address is IP 2, protocol type is TCP, source port number is 32768, and destination port number is 80, a quantity of packets corresponding to the data flow is 1000, and the flow record further includes other information (not specifically shown in FIG. 7).

Packets may be classified into two types: an abnormal packet and a normal packet. The abnormal packet is a packet whose packet information is abnormal, for example, a plurality of packets carrying a same status flag in a same data flow, a packet that is lost, a packet with a delay, and a packet including too many bytes. The normal packet is a packet whose packet information is normal.

For example, the network device parses each piece of packet information in a data flow, to identify an abnormal packet, for example, a plurality of TCP SYN packets, a reset packet, a packet whose TCP window is 0, a packet discarded by the network device, a packet with a too long forwarding delay in the network device, and a packet whose TTL is 0. In addition to the foregoing examples, the network device may further parse each packet to find another abnormality, so as to determine an abnormal packet.

To distinguish between different abnormality types of abnormal packets, a corresponding abnormality flag may be allocated to each abnormality type. For example, an abnormality flag corresponding to an abnormal packet in the plurality of TCP SYN packets is A1, an abnormality flag corresponding to the reset packet is A2, an abnormality flag corresponding to the packet discarded by the network device is B1, an abnormality flag of the packet whose TCP window is 0 is B2, an abnormality flag corresponding to the packet with a too long forwarding delay in the network device is C1, and an abnormality flag corresponding to the packet whose TTL is 0 is C2. In this way, an abnormal packet and an abnormality type corresponding to the abnormal packet can be quickly determined directly by identifying an abnormality flag.

In another implementation, the network device may alternatively generate the flow table based on different tuple information of packets, for example, generate the flow table based on four-tuple information, a triplet, or a 2-tuple. The network device may alternatively generate the flow table by using software.

S102: The network device determines an abnormal flow.

Data flows including packets may be classified into two types: an abnormal data flow (which may also be referred to as an abnormal flow) and a normal data flow (which may also be referred to as a normal flow). The abnormal flow is a data flow including an abnormal packet, and the normal flow is a data flow including no abnormal packet.

When packet forwarding quality of the network device is managed and controlled, only when a specific abnormality occurring when the network device forwards a packet is determined in time, a reason why the abnormality occurs can be analyzed in time, to make a targeted improvement, and effectively ensure the packet forwarding quality of the network device. Therefore, it is very important to analyze the abnormal flow.

Abnormal flows carrying different packet abnormality flags have different data flow abnormality types. Abnormal flows corresponding to all packet abnormality flags may be sent to an analyzer for analysis, or an abnormal flow corresponding to a specified packet abnormality flag may be sent to an analyzer for analysis. An abnormal flow that does not need to be analyzed may be approximately considered as a normal flow. In the latter case, a user needs to analyze only the abnormal flow with the specified packet abnormality flag, instead of analyzing all abnormal flows indiscriminately, to reduce an analysis workload.

In this case, the user may preconfigure an abnormal flow identification rule in an abnormal flow identification module. In other words, the abnormal flow is determined by identifying the specified abnormality flag. For example, when the abnormal flow identification rule is that the specified abnormality flag is A1, if the abnormal flow identification module identifies that a data flow carries A1, the data flow is an abnormal flow; and when the abnormal flow identification rule is that the specified abnormality flag is A2, if the abnormal flow identification module identifies that a data flow carries A2, the data flow is an abnormal flow.

Further, abnormal flows carrying different abnormality types of abnormal packets correspond to different abnormality types. For example, for an abnormal flow carrying A1, it indicates that a plurality of packets each carry a connection request status flag, and such an abnormality type may be referred to as a handshake abnormality (for example, a TCP multi-SYN abnormality); and for an abnormal flow carrying A2, it indicates that a packet carries a connection interruption request status flag, and such an abnormality type may be referred to as abnormal link interruption (for example, a receiver sends a TCP reset packet). To identify different abnormality types of abnormal flows, the abnormal flow identification module may configure different abnormality type marks for the different abnormality types. For example, an abnormality type mark corresponding to the handshake abnormality is a1, and an abnormality type mark corresponding to a link establishment abnormality is a2.

After an abnormality type mark corresponding to an abnormal flow is determined, the abnormality type mark may be written into a flow record corresponding to the abnormal flow, and the abnormality type mark is sent to the analyzer together with the flow table. In this way, the analyzer can learn, by parsing the flow table, of an abnormality type corresponding to the abnormal flow, and then make a targeted analysis of the abnormality type. In an implementation, the network device determines, at a preset time point, whether a flow record of an abnormal flow exists.

For example, when a flow record ages, the network device determines whether the flow record corresponds to an abnormal flow. If the network device does not receive, within a specific time period, a packet corresponding to a data flow, it is considered that a flow record corresponding to the data flow ages. In this case, it is determined, for a generated flow record, whether a data flow corresponding to the flow record is an abnormal flow.

Alternatively, when transmission of a data flow ends, the network device determines, based on a flow record of the data flow, whether the data flow is an abnormal flow. For a short data flow, transmission of the data flow may be completed within a very short time period, for example, within 1 second. Because a transmission time period is short, timeliness is not affected even if it is determined, after transmission of the data flows ends, whether the data flow is an abnormal flow. Therefore, whether a data flow is an abnormal flow may be determined based on a flow record of the data flow after transmission of the data flow ends.

Alternatively, when a preset time period ends, the network device determines, based on a flow record, whether an abnormal flow exists. For a data flow whose relative duration is long, transmission of the data flow cannot be completed in a short time period. Because a transmission time period is long, timeliness of determining may be affected if it is determined, after transmission of the data flow ends, whether the data flow is an abnormal flow. Therefore, a time period, for example, 1 second, may be preset. In this case, even if data flow transmission is not completed after every 1 second, whether a flow record of an abnormal flow exists is determined based on a currently generated flow table, to ensure the timeliness of determining.

After identifying the flow record of the abnormal flow, the network device stores the flow record in an abnormal flow table. The abnormal flow table includes a flow record and an abnormality type identifier that correspond to each abnormal flow. In an implementation, the flow record in the abnormal flow table may be ranked based on a writing time point. To be specific, a flow record written earlier is located before a flow record written later, so that the flow record written earlier may be preferentially sent to the analyzer for analysis. In another implementation, the flow record in the abnormal flow table may be ranked based on a ranking rule, and the ranking rule may be set based on a priority of an abnormality type, a weight of an abnormality type, or the like. In this way, a flow record of an abnormal flow of an abnormality type with a higher priority may be preferentially sent.

S103: The network device sends a flow record of an abnormal flow to the analyzer when determining the abnormal flow, so that the analyzer analyzes the abnormal flow.

The network device sends only the flow record of the abnormal flow to the analyzer, so that the analyzer makes an analysis. In this way, a quantity of flow records that need to be analyzed by the analyzer can be greatly reduced. In addition, it can be ensured that the analyzer analyzes each abnormal flow without missing an abnormal flow, and a problem can be found and resolved in time. In this way, strength of managing and controlling packet forwarding quality of the network device is ensured.

In an implementation, the network device may send the abnormal flow table based on a first period. The first period may be set by the user, or may be set by the network device based on a current analysis capability of the analyzer. For example, if the analyzer is currently idle, in other words, an analysis speed is high, the first period may be short. If current load of the analyzer is large, in other words, an analysis speed is low, the first period may be long.

Each network device on the packet forwarding path sends a flow table to the analyzer in the foregoing manner. For the packet forwarding path shown in FIG. 4, the leaf switch 1, the backbone switch 1, and the leaf switch 3 each send a flow table to the analyzer. In this way, the analyzer may analyze a correlation between network devices based on the received flow table, to obtain a traffic analysis result of the data flow on the packet forwarding path.

It can be learned from the foregoing descriptions that, according to the flow table sending method provided in Embodiment 1, the abnormal flow may be identified, and then only the flow record corresponding to the abnormal flow may be sent to the analyzer, to greatly reduce a quantity of flow records to be analyzed by the analyzer. In addition, the analyzer may be enabled to analyze each abnormal flow, to monitor an abnormality occurring when the network device forwards a packet, so as to improve strength of monitoring packet forwarding quality by the network device.

Embodiment 2

Figure 8:
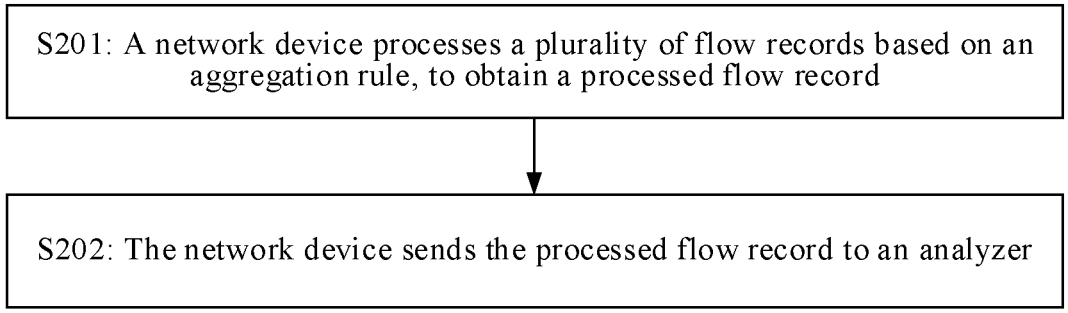
FIG. 8 is a schematic flowchart of another flow table sending method according to an embodiment of this application.

Based on Embodiment 1, if a data flow corresponding to a plurality of flow records in a flow table needs to be further analyzed as a whole, to analyze a traffic component, a traffic bandwidth, and the like of forwarding in a network, and implement visualization of the traffic bandwidth, the traffic component, and the like, a flow table sending method provided in Embodiment 2 may be used. The method is specifically as follows:

FIG. 8 is a schematic flowchart of another flow table sending method according to an embodiment of this application. As shown in FIG. 8, the method includes the following steps.

S201: A network device processes a plurality of flow records based on an aggregation rule, to obtain a processed flow record, where a quantity of processed flow records is less than a quantity of the plurality of flow records.

The quantity of processed flow records may be reduced by performing the foregoing operation. The network device transmits each flow record in a flow table to an aggregation module for aggregation processing. The aggregation module may be a hardware chip, or may be software. A flow table shown in FIG. 7 is used as an example. The network device transmits flow records 1 to 4 to the aggregation module for aggregation processing. The aggregation module processes the flow records 1 to 4 based on the aggregation rule, to obtain processed flow records shown in FIG. 9. It can be learned that, only two processed flow records, that is, flow records 5 and 6 remain. In other words, only the flow records 5 and 6 need to be sent to the analyzer for analysis, to reduce the quantity of flow records.

Specifically, the network device may perform, based on the aggregation rule, aggregation processing on flow records that include a same identifier.

In this embodiment, different flow records include different identifiers such as a source address, a destination address, a protocol type, a source port number, and a destination port number. Different identifiers are combined, to obtain different tuples, for example, a 5-tuple (a source address, a destination address, a protocol type, a source port number, and a destination port number), a 4-tuple (a source address, a destination address, a protocol type, and a destination port number), a triplet (a source address, a destination address, and a protocol type), and a 2-tuple (a source address and a destination address). As mentioned above, flow tables corresponding to different tuples may be generated for the packet based on a requirement. If the flow record has 5-tuple information, a correspondingly generated flow table is a 5-tuple flow table, and so on.

A 5-tuple flow table provided in FIG. 7 is used as an example. Specific information of 5-tuples corresponding to all flow records includes only some same identifiers. For example, for a flow record 1 and a flow record 3, same identifiers of the flow record 1 and the flow record 3 are a source address, a destination address, a protocol type, and a destination port number; and for a flow record 2 and a flow record 4, same identifiers of the flow record 2 and the flow record 4 are a source address, a destination address, a protocol type, and a source port number. In this way, the flow record 1 and the flow record 3 may be aggregated into one flow record based on the same identifiers, and the flow record 2 and the flow record 4 may be aggregated into one flow record based on the same identifiers.

Figure 10:
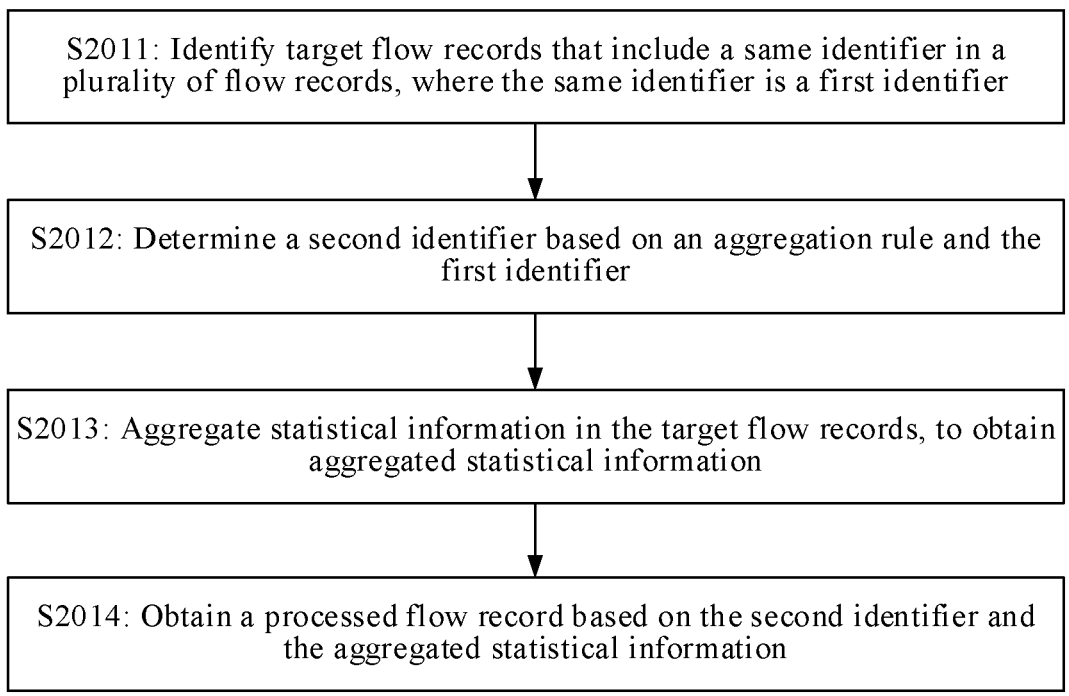
FIG. 10 is a schematic flowchart of aggregating flow records according to an embodiment of this application.

FIG. 10 is a schematic flowchart of aggregating flow records according to an embodiment of this application. As shown in FIG. 10, the method includes the following steps.

S2011: Identify target flow records that include a same identifier in the plurality of flow records, where the same identifier is a first identifier.

S2012: Determine a second identifier based on the aggregation rule and the first identifier.

S2013: Aggregate statistical information in the target flow records, to obtain aggregated statistical information.

S2014: Obtain the processed flow record based on the second identifier and the aggregated statistical information.

In an implementation, the flow table shown in FIG. 7 is used as an example. If a specified port number is 80, the port number 80 is used as an identification condition for determining a same identifier. It can be learned that target flow records that include a same specified port number (that is, a same identifier) in the flow records 1 to 4 are the flow record 1 and the flow record 3, and the flow record 2 and the flow record 4. For the flow record 1 and the flow record 3, the same identifier is a destination port number, and the destination port number is a first identifier. For the flow record 2 and the flow record 4, the same identifier is a source port number, and the source port number is the first identifier. The aggregation rule is specifically that the first identifier is set to a server port number. In addition, if the first identifier is a source port number, it is considered that a packet is forwarded from a server to a client. In other words, a source address is a server address, and a destination address is a client address. If the first identifier is a destination port number, it is considered that a packet is forwarded from a client to a server. In other words, a source address is a client address, and a destination address is a server address. In this way, a corresponding second identifier used after aggregation is determined, and flow records with a same second identifier are aggregated. For example, a source address of the flow record 1 and the flow record 3 is determined as a client address used after aggregation, a destination address is determined as a server address used after aggregation, a protocol type is determined as a protocol type used after aggregation, a destination port number is determined as a server port number used after aggregation, and a source port number is deleted. That is, the second identifier is a client address IP 1, a server address IP 2, a protocol type TCP, and a server port number 80. A destination address of the flow record 2 and the flow record 4 is determined as a client address used after aggregation, a source address is determined as a server address used after aggregation, a protocol type is determined as a protocol type used after aggregation, a source port number is determined as a server port number used after aggregation, and a destination port number is deleted. That is, the second identifier is a client address IP 1, a server address IP 2, a protocol type TCP, and a server port number 80.

Information in the flow records having a same second identifier is aggregated, to obtain aggregated statistical information. For example, aggregation processing is performed on a quantity of packets, and the like, and a quantity of normal flows, a quantity of abnormal flows, and a quantity of data flows existing before aggregation may be further counted. As shown in FIG. 9, the second identifier and the corresponding aggregated statistical information are summarized, to obtain the processed flow record. For example, a flow record 5 is obtained by performing aggregation processing on the flow record 1 and the flow record 3, and a flow record 6 is obtained by performing aggregation processing on the flow record 2 and the flow record 4.

In another implementation, the flow table shown in FIG. 7 is used as an example. A same identifier in all flow records in the flow table may be determined by comparing identifiers in all the flow records in the flow table. Usually, an identifier that can still form a tuple is selected based on a same identifier. For example, if the flow record 1 and the flow record 3 include same identifiers: a source address, a destination address, a protocol type, and a destination port number, and the four identifiers may form a four-tuple, the identifiers may be the first identifier; if the flow record 2 and the flow record 4 include same identifiers: a source address, a destination address, a protocol type, and a source port number, but the identifiers cannot form a tuple, the identifiers are not first identifiers; if the flow record 1 and the flow record 3 include same identifiers: a source address, a destination address, and a protocol type, and the three identifiers may form a triplet, the identifiers may be the first identifier; if the flow record 2 and the flow record 4 include same identifiers: a source address, a destination address, and a protocol type, and the three identifiers may form a triplet, the identifiers may be the first identifier; if the flow record 1 and the flow record 3 include same identifiers: a source address and a destination address, and the two identifiers may form a 2-tuple, the identifiers may be the first identifier; and if the flow record 2 and the flow record 4 include same identifiers: a source address and a destination address, and the two identifiers may form a 2-tuple, the identifiers may be the first identifier.

If the aggregation rule is specifically that a triplet flow table is obtained through aggregation, the first identifier is a source address, a destination address, and a protocol type, and the corresponding second identifier used after aggregation also needs to be the source address, the destination address, and the protocol type. Information in the flow records having a same second identifier is aggregated, to obtain the aggregated statistical information. As shown in FIG. 11, the second identifier and the corresponding aggregated statistical information are summarized, to obtain the processed flow record. For example, a flow record 7 is obtained by performing aggregation processing on the flow record 1 and the flow record 3, and a flow record 8 is obtained by performing aggregation processing on the flow record 2 and the flow record 4.

It can be learned that, after aggregation processing, the quantity of flow records can be effectively reduced, in other words, a quantity of flow records that need to be analyzed is reduced, so as to match an analysis capability of the analyzer.

S202: The network device sends the processed flow record to the analyzer.

After performing aggregation processing to obtain the processed flow record, the network device stores the processed flow record in a statistical flow table. The statistical flow table includes each processed flow record.

The network device may send the processed flow record based on a second period, and the second period may be set to a time point at which the flow table ages or a time point at which data flow transmission ends. In this way, it can be ensured that flow records generated for all packets are sent to the analyzer for analysis, so that the analyzer analyzes a traffic forwarding path, and the like based on a most complete flow record.

In comparison with the first period provided in Embodiment 1, the first period may be less than the second period. In this case, an abnormal flow table can be sent in a more timely manner, timeliness of analyzing the abnormal flow by the analyzer can be improved, and a quantity of flow records analyzed by the analyzer can be reduced. Further, a time difference between the first period and the second period may be set, to avoid simultaneously sending the abnormal flow table and the statistics flow table to the analyzer. Certainly, when the analysis capability of the analyzer is rich, a sending manner in which the first period is equal to the second period may be used to simultaneously send the abnormal flow table and the statistical flow table, to also improve timeliness of sending the statistical flow table.

It can be learned from the foregoing descriptions that, in the flow table sending method provided in Embodiment 2, on a basis of sending the complete flow record that is of the abnormal flow and that is obtained in Embodiment 1, all flow records obtained after aggregation processing may be simultaneously sent. In this way, not only the abnormal flow can be specifically analyzed, but also all data flows forwarded by the network device are analyzed, to satisfy an analysis in two dimensions of a packet forwarding abnormality and an overall packet forwarding process of the network device. In addition, a quantity of flow records used to analyze the overall packet forwarding process can be effectively reduced, to better match the analysis capability of the analyzer.

Embodiment 3

Based on Embodiment 1 and Embodiment 2, Embodiment 3 provides a third flow table sending method. The method specifically includes the following steps.

Figure 12:
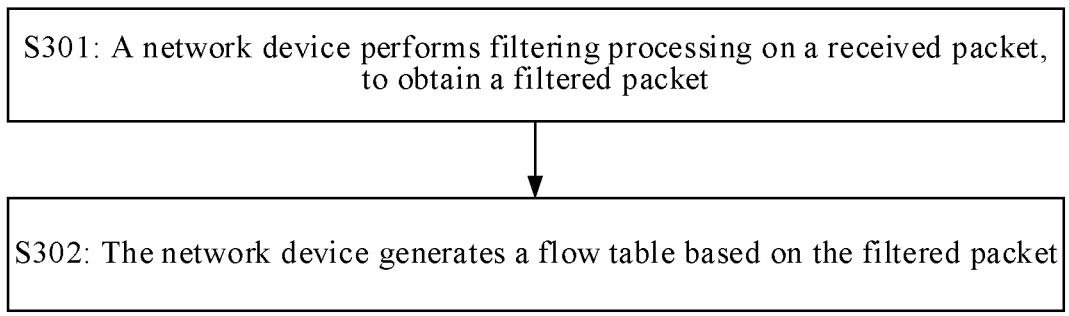
FIG. 12 is a schematic flowchart of still another flow table sending method according to an embodiment of this application.

FIG. 12 is a schematic flowchart of still another flow table sending method according to an embodiment of this application. As shown in FIG. 12, the method includes the following steps.

S301: A network device performs filtering processing on a received packet, to obtain a filtered packet.

S302: The network device generates a flow table based on the filtered packet.

An access control list ACL may be configured on the network device to match a packet that needs to be analyzed, to create a flow table for a matched packet. In this way, a quantity of flow records in the flow table can be reduced to some extent. A matching rule of the ACL may be set based on historical data, for example, a historical abnormal packet and a packet that needs to be selectively analyzed.

It can be learned from the foregoing descriptions that, based on Embodiment 1 and Embodiment 2, a quantity of flow records can be further reduced in this embodiment, to reduce pressure of identifying an abnormal flow and aggregating flow records by the network device. In addition, a quantity of flow records that need to be analyzed by the analyzer can also be reduced, to better match an analysis capability of the analyzer.

In the foregoing embodiments provided in this application, solutions of the flow table sending method provided in this application are separately described from a perspective of a device and from a perspective of interaction between devices. It can be understood that, to implement the foregoing functions, each device, for example, the foregoing network device or the storage device, includes a corresponding hardware structure and/or software module for performing each function. A person skilled in the art should be easily aware that units, algorithms, and steps in the examples described with reference to embodiments disclosed in this specification can be implemented in a form of hardware or a combination of hardware and computer software in this application. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of this application.

For example, the foregoing device implements a corresponding function by using a software module.

Figure 13:
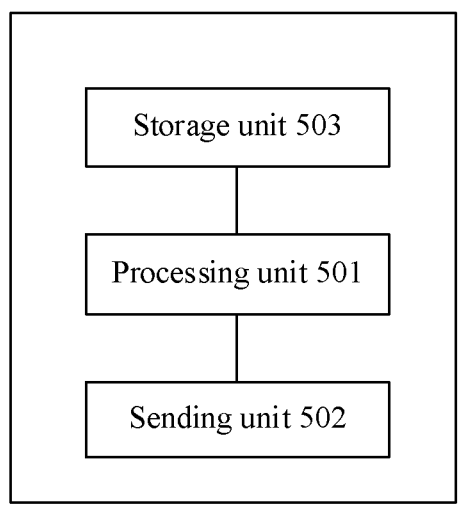
FIG. 13 is a schematic diagram of a structure of a flow table sending apparatus according to an embodiment of this application.

In an embodiment, as shown in FIG. 13, a flow table sending apparatus having a function of implementing a behavior of the network device includes a processing unit 501 and a sending unit 502. The processing unit 501 is configured to generate a flow table. The flow table includes a plurality of flow records. The processing unit 501 is further configured to determine whether a data flow corresponding to the plurality of flow records is an abnormal flow. The sending unit 502 is configured to send a flow record of an abnormal flow to an analyzer when the processing unit determines the abnormal flow, so that the analyzer analyzes the abnormal flow.

According to the apparatus, after the network device generates the flow table, to ensure that the analyzer can analyze each abnormal data flow to ensure monitoring of the network device, the network device determines each flow record in the flow table, to determine the abnormal flow, and sends the flow record of the abnormal flow to the analyzer. In this way, the analyzer can analyze each abnormal data flow. In addition, because the network device sends only the flow record of the abnormal flow, a quantity of sent flow records can be greatly reduced, so that a quantity of flow records that need to be analyzed better matches a flow record analysis speed of the analyzer, thereby fundamentally resolving a problem that a quantity of flow records sent by the network device does not match an analysis capability of the analyzer.

Optionally, the processing unit 501 is further configured to process the plurality of flow records based on an aggregation rule, to obtain a processed flow record. A quantity of processed flow records is less than a quantity of the plurality of flow records. The sending unit 502 is further configured to send the processed flow record to the analyzer. Therefore, the plurality of flow records may include both the flow record of the abnormal flow and a flow record of a normal flow, to analyze overall performance of the data flow that corresponds to the plurality of flow records and that is forwarded by the network device. After processing, the plurality of flow records may be aggregated into a smaller quantity of flow records, to reduce the quantity of flow records that need to be analyzed by the analyzer. In addition, based on a specific flow record of the abnormal flow sent in the foregoing process, not only the abnormal flow can be specifically analyzed, but also all data flows forwarded by the network device can be analyzed.

Optionally, the sending unit 502 is further configured to send the flow record of the abnormal flow based on a first period, and the sending unit 502 is further configured to send the processed flow record based on a second period. The first period is less than or equal to the second period. Therefore, the network device may asynchronously send, based on different periods, the flow record of the abnormal flow and flow records of all flows including the abnormal flow, and in particular, may send the flow record of the abnormal flow based on a shorter period, to improve timeliness of analyzing the abnormal flow by the analyzer.

Optionally, the processing unit 501 is further configured to perform, based on the aggregation rule, aggregation processing on flow records that include a same identifier, to obtain a processed flow record. Therefore, after processing, the plurality of flow records can be aggregated into a smaller quantity of flow records, to reduce the quantity of flow records that need to be analyzed by the analyzer. In addition, flow records of a same type (having a same identifier) are aggregated in advance, so that the analyzer can directly perform an overall analysis on different types of flow records, to improve an overall effect of the analysis.

Optionally, each flow record includes an identifier identifying a data flow and statistical information of the data flow. The processing unit 501 is further configured to: identify target flow records that include a same identifier in the plurality of flow records, where the same identifier is a first identifier; and determine a second identifier based on the aggregation rule and the first identifier. The processing unit 501 is further configured to aggregate statistical information in the target flow records, to obtain aggregated statistical information. The processing unit 501 is further configured to obtain the processed flow record based on the second identifier and the aggregated statistical information. Therefore, the network device may aggregate the flow records in the flow table based on a same identifier, to reduce a quantity of processed flow records.

Optionally, the flow record of the abnormal flow carries an abnormality type mark. Therefore, an abnormality type of the abnormal flow may be recorded in the flow record that is of the abnormal flow and that is sent by the network device, to provide an analysis direction for the analyzer.

Optionally, as shown in FIG. 13, the apparatus further includes a storage unit 503. The storage unit 503 is configured to: store the flow record of the abnormal flow in an abnormal flow table, and store the processed flow record in a statistical flow table. Therefore, the flow record of the abnormal flow and the processed flow record may be stored separately, so that the network device extracts, for sending, a flow record from a corresponding storage medium based on a requirement, to improve flow record management effectiveness.

Optionally, the processing unit 501 is further configured to determine, at a preset time point, whether a flow record of an abnormal flow exists. The preset time point is a time point at which the flow record ages, a time point at which data flow transmission ends, or a time point at which a preset time period ends. Therefore, the flow record of the abnormal flow may be sent in time when the flow table ages or when data flow transmission ends. In addition, when the data flow is too long, a flow record of the data flow may be determined and sent for a plurality of times, to improve timeliness of analyzing the data flow.

Optionally, the processing unit 501 is further configured to generate the flow table based on a filtered packet. Therefore, a packet matching rule such as an ACL may also be set on the network device, so that the network device first selects a packet that need to be analyzed, and generates a flow record based on the packet that needs to be analyzed, to reduce flow records that need to be analyzed.

In addition, for example, the foregoing device may implement a corresponding function by using a hardware module.

In an embodiment, the foregoing function of the network device may be implemented based on the structure shown in FIG. 2. For example, an interface unit 323 is configured to: receive a packet sent by an upstream network device, forward the packet to a downstream network device, and send a flow table to an analyzer. A memory 312 and/or a memory 322 store/stores computer program code/instructions. When a processor 311 and/or a processor 321 execute/executes the computer program code/instructions, the network device is enabled to perform the method in the foregoing embodiments, for example, obtain a packet, generate a flow table, determine whether a data flow corresponding to a flow record is an abnormal flow, and when determining that the data flow is an abnormal flow, indicate to send a flow record corresponding to the abnormal flow to an analyzer, or the like.

In another embodiment, the foregoing function of the network device may be implemented based on the hardware structure shown in FIG. 3. For example, a communication interface 332 receives a packet sent by an upstream network device, and forwards the packet to a downstream network device, a memory, and an analyzer. A memory 331 stores computer program code/instructions. When a processor 333 executes the computer program code/instructions, the network device is enabled to perform the method in the foregoing embodiments, for example, obtain a packet, generate a flow table based on the packet, determine whether a data flow corresponding to a flow record is an abnormal flow, and when determining that the data flow is an abnormal flow, indicate to send a flow record corresponding to the abnormal flow to an analyzer, or the like.

An embodiment of this application further provides a computer storage medium. The computer storage medium stores computer program code/instructions. When the computer program code/instructions runs/run on a computer device, the computer device is enabled to perform the method in the foregoing aspects.

An embodiment of this application further provides a computer program product including instructions. When the computer program product runs on a computer device, the computer device is enabled to perform the method in the foregoing aspects.

This application further provides a chip system. The chip system includes a processor, configured to support the foregoing apparatus or device to implement functions in the foregoing aspects, for example, generate or process information in the foregoing methods. In a possible design, the chip system further includes a memory, configured to store program instructions and data that are necessary for the foregoing apparatus or device. The chip system may include a chip, or may include a chip and another discrete component.

The objectives, technical solutions, and beneficial effect of the present invention are further described in detail in the foregoing specific implementations. It should be understood that the foregoing descriptions are merely specific implementations of the present invention, but are not intended to limit the protection scope of the present invention. Any modification, equivalent replacement, or improvement made based on the technical solutions of the present invention shall fall within the protection scope of the present invention.

What is claimed is:

1. A flow table sending method, wherein the method comprises:
    generating, by a network device, a flow table comprising a plurality of flow records;
    determining, by the network device, whether a data flow corresponding to the plurality of flow records is an abnormal flow;
    sending, by the network device, a flow record of the abnormal flow to an analyzer in response to a determination that the data flow is the abnormal flow, so that the analyzer analyzes the abnormal flow;
    processing, by the network device, the plurality of flow records based on an aggregation rule to obtain a processed flow record, wherein a quantity of processed flow records is less than a quantity of the plurality of flow records; and
    sending, by the network device, the processed flow record to the analyzer, wherein the network device sends the flow record of the abnormal flow based on a first period, the network device sends the processed flow record based on a second period, and the first period is less than or equal to the second period.

2. The method according to claim 1, wherein processing, by the network device, the plurality of flow records based on the aggregation rule comprises:
    performing, by the network device based on the aggregation rule, aggregation processing on flow records that comprise a same identifier to obtain the processed flow record.

3. The method according to claim 2, wherein:
each flow record comprises an identifier identifying data flow and statistical information of the data flow; and
performing aggregation processing on flow records that comprise the same identifier comprises:
identifying target flow records that comprise the same identifier in the plurality of flow records, wherein the same identifier is a first identifier,
determining a second identifier based on the aggregation rule and the first identifier,
aggregating statistical information in the target flow records, to obtain aggregated statistical information, and
obtaining the processed flow record based on the second identifier and the aggregated statistical information.

4. The method according to claim 1, wherein the network device stores the flow record of the abnormal flow in an abnormal flow table, and stores the processed flow record in a statistical flow table.

5. The method according to claim 1, wherein the flow record of the abnormal flow carries an abnormality type mark.

6. The method according to claim 1, further comprising:
determining, by the network device at a preset time point, whether a flow record of the abnormal flow exists, wherein the preset time point is a time point at which the flow record ages, a time point at which data flow transmission ends, or a time point at which a preset time period ends.

7. The method according to claim 1, wherein generating, by the network device, the flow table comprises:
generating, by the network device, the flow table based on a filtered packet.

8. A non-transitory computer storage medium with instructions stored thereon, wherein when the instructions are executed by a processor, the processor is enabled to perform the method according to claim 1.

9. A flow table sending apparatus, comprising:
a processor, configured to:
generate a flow table comprising a plurality of flow records,
determine whether a data flow corresponding to the plurality of flow records is an abnormal flow, and
process the plurality of flow records based on an aggregation rule to obtain a processed flow record, wherein a quantity of processed flow records is less than a quantity of the plurality of flow records; and
a communication circuit configured to:
send a flow record of the abnormal flow to an analyzer in response to the processor determining that the data flow is the abnormal flow, so that the analyzer analyzes the abnormal flow,
send the processed flow record to the analyzer,
send the flow record of the abnormal flow based on a first period,
send the processed flow record based on a second period, wherein the first period is less than or equal to the second period.

10. The apparatus according to claim 9, wherein
the processor is further configured to perform, based on the aggregation rule, aggregation processing on flow records that comprise a same identifier, to obtain the processed flow record.

11. The apparatus according to claim 10, wherein:
each flow record comprises an identifier identifying data flow and statistical information of the data flow; and
the processor is further configured to:
identify target flow records that comprise the same identifier in the plurality of flow records, wherein the same identifier is a first identifier,
determine a second identifier based on the aggregation rule and the first identifier,
aggregate statistical information in the target flow records, to obtain aggregated statistical information, and
obtain the processed flow record based on the second identifier and the aggregated statistical information.

12. The apparatus according to claim 9, further comprising a memory configured to:
store the flow record of the abnormal flow in an abnormal flow table; and
store the processed flow record in a statistical flow table.

13. The apparatus according to claim 9, wherein the flow record of the abnormal flow carries an abnormality type mark.

14. The apparatus according to claim 9, wherein
the processor is further configured to determine, at a preset time point, whether a flow record of the abnormal flow exists, wherein the preset time point is a time point at which the flow record ages, a time point at which data flow transmission ends, or a time point at which a preset time period ends.

15. The apparatus according to claim 9, wherein the processor is further configured to generate the flow table based on a filtered packet.

16. A network device, comprising a processor and a memory coupled to the processor with instruction stored thereon, wherein, when the processor executes the instructions, the network device is enabled to perform a method comprising:
generating a flow table comprising a plurality of flow records;
determining whether a data flow corresponding to the plurality of flow records is an abnormal flow;
sending a flow record of the abnormal flow to an analyzer in response to a determination that the data flow is the abnormal flow, so that the analyzer analyzes the abnormal flow;
processing the plurality of flow records based on an aggregation rule to obtain a processed flow record, wherein a quantity of processed flow records is less than a quantity of the plurality of flow records; and
sending the processed flow record to the analyzer, wherein the network device sends the flow record of the abnormal flow based on a first period, the network device sends the processed flow record based on a second period, and the first period is less than or equal to the second period.

17. The network device according to claim 16, wherein processing the plurality of flow records based on the aggregation rule comprises:
performing, based on the aggregation rule, aggregation processing on flow records that comprise a same identifier to obtain the processed flow record.

18. The network device according to claim 17, wherein:
each flow record comprises an identifier identifying data flow and statistical information of the data flow; and
performing aggregation processing on flow records that comprise the same identifier comprises:
identifying target flow records that comprise the same identifier in the plurality of flow records, wherein the same identifier is a first identifier,
determining a second identifier based on the aggregation rule and the first identifier, aggregating statistical information in the target flow records, to obtain aggregated statistical information, and obtaining the processed flow record based on the second identifier and the aggregated statistical information.

19. The method according to claim 1, wherein sending, by the network device, the flow record of the abnormal flow to the analyzer comprising sending the flow record of the abnormal flow to the analyzer via a network interface.

20. The apparatus according to claim 9, wherein the communication circuit is configured to send the flow record of the abnormal flow to the analyzer via a network interface.

* * * * *